United States Patent Office 3,283,691
Patented Nov. 8, 1966

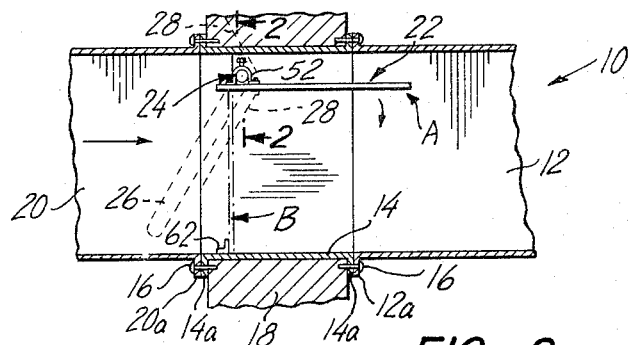
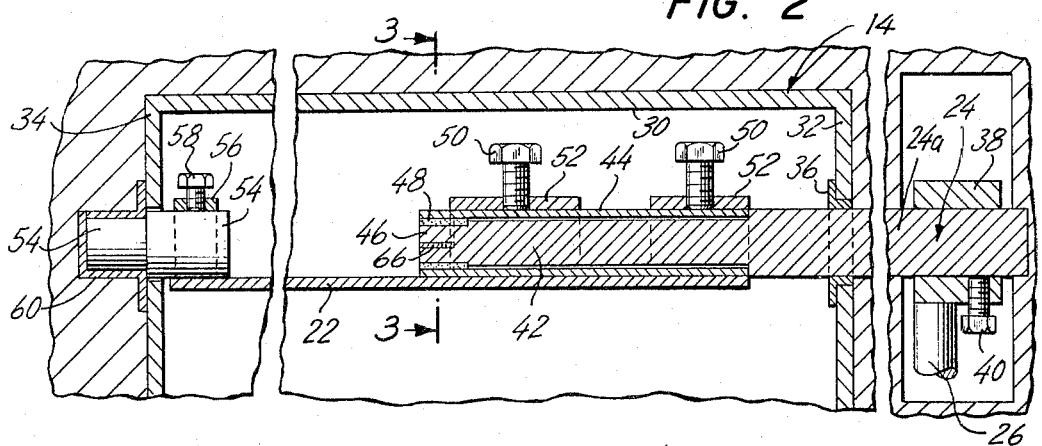
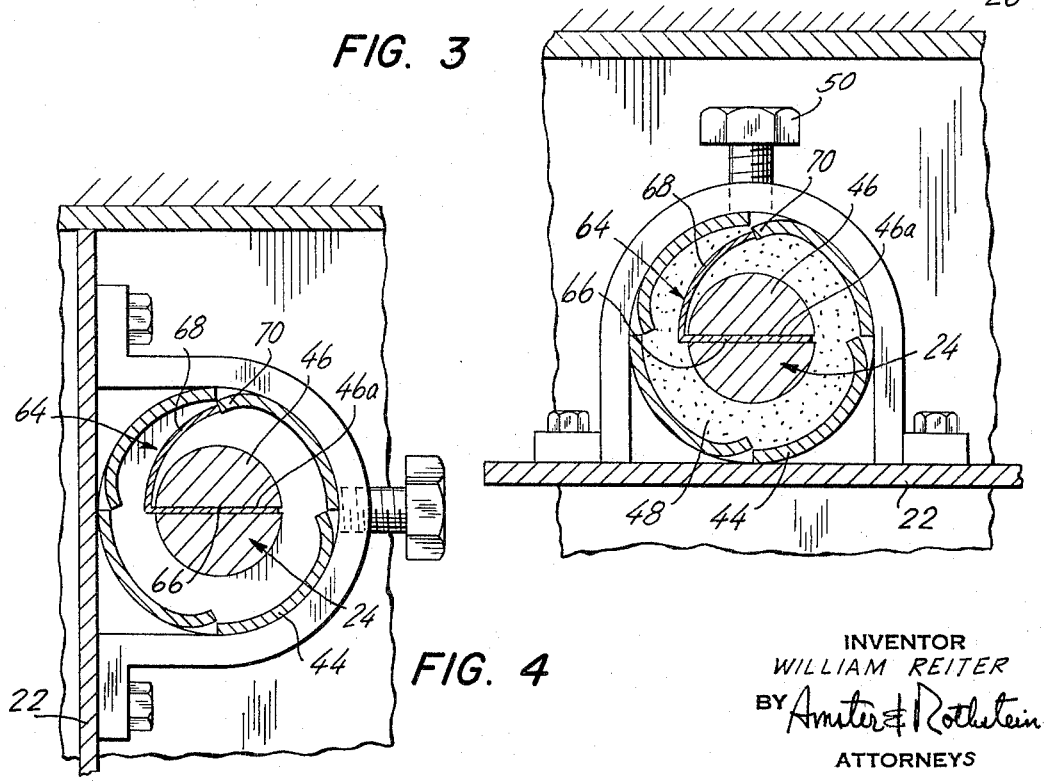

3,283,691
VENTILATING DUCT DAMPER
William Reiter, 2530 Holland Ave., Bronx, N.Y.
Filed Sept. 8, 1964, Ser. No. 394,768
6 Claims. (Cl. 98—1)

The present invention relates generally to equipment for use in ventilating systems and in particular to a damper construction which provides both the functions of a control damper and a fire safety damper which closes automatically when a fire is present.

In a typical ventilating duct system, of the type used either for air conditioning, heating or ventilating purposes, a network of sheet metal ducts is formed within the building. At a plurality of locations within the network, there are provided dampers to close or partially separate one or more portions of the network with respect to other portions thereby to provide a measure of control over the air flow in the ventilating system.

In addition to the control dampers, there are provided fire control dampers at each point where a ventilating duct passes through a fire wall. These fire control dampers are provided with means to automatically close the damper upon the detection of the existence of a fire. They usually include a gravity or spring-biased damper blade which is held in its open position, against the bias force, by a mechanism which includes one element formed of a low melting point material. In accordance with most local building codes and fire regulations, the fire control damper is arranged to automatically close at a temperature between 158 and 160 degrees Fahrenheit. Specifically, a material is selected which has a melting point of approximately 158 degrees, such that upon the ambient temperature reaching that level, the low-melting point element melts, thus releasing the bias force on the control damper and allowing the same to assume its closed position. Normally, a spring latch is used in association with the control damper blade to retain the fire control damper in its closed position.

Often, a fire control damper of the general type described and a control damper are found immediately adjacent to each other in a ventilating system since the fire walls often form the boundaries of the various control areas in the system.

Control dampers are formed in a large variety of differing designs but they all basically include a movable mounted blade, usually pivoting about a horizontal or vertical axis, with control means such as a hand or a motor-driven control unit operably connected to the pivot shaft of the damper blade for setting the blade in the desired control position.

Significant advantages in materials, construction costs and maintenance are effected by combining the mechanisms and functions of the separate control dampers and fire safety dampers into one damper unit. Specifically, it is desirable to provide in a given damper construction means whereby the damper blade may be set at any desired position, either manually or by automatic equipment, to provide a controlled amount of air flow through the duct system and, at the same time, to provide automatic means to completely close the damper blade in response to detection of a fire. The present invention is specifically concerned with the provision of such a damper construction.

Generally, it is an object of the present invention to provide a damper construction wherein a single damper assembly may be utilized both for damper control functions and automatic fire safety functions. Specifically, it is an object of the present invention to build into a damper assembly an adjustable means for varying the position of a damper blade in combination with automatic means which will automatically bring the damper blade to a closed position in response to the elevation of the ambient temperature to a selected level.

It is a further object of the present invention to provide a damper pivot shaft which normally provides a rigid interconnection between a control member such as a handle or motor and the damper blade but which becomes a flexible member when a given ambient temperature is reached and to provide bias means to cause the damper blade to close when that ambient temperature is reached.

It is further within the contemplation of the present invention to provide a pivot shaft for a damper blade which is formed as two sections interconnected by a low melting point material such that at low temperatures a damper connected to one end of the shaft may be controlled by an element connected to the other end of the shaft. At a high temperature the connecting material melts and the pivot shaft is split into two members rotatable with respect to each other such that the damper blade may rotate to its closed position irrespective of the position of the control member.

It is a further object of the present invention to incorporate within such a two-element member ratchet means which will enable a damper blade to move to its closed position when an elevated temperature is reached but will prevent movement of the damper blade out of its closed position.

In accordance with one illustrative embodiment of the present invention there is provided a damper assembly for controlling the air flow of a ventilating duct which comprises a damper blade shaped to be complimentary to the cross-sectional shape of the duct. A control and actuating rod is engaged with the damper blade and includes a first section rigidly secured to the damper blade and a second section rigidly connected to a control member. The control member may be, of course, either a manual device such as a control handle or a self-powered device such as a motor forming part of an automatic control system. A low-melting point connecting material is provided which normally rigidly secures the first section to the second section of the control and actuating rod to form the same into a rigid unitary control member, such that a rigid operative interconnection exists between the control and the damper blade when the temperature is below the melting point of the connecting material and such that the damper blade is free to rotate with respect to the control member when the temperature is above the melting point of the connecting material.

The damper blade is mounted within the duct and is biased for movement into a normally closed position. Ratchet stop means are provided to allow the damper blade to move into its closed position and to prevent movement out of that closed position.

The above brief description, as well as further objects, features and advantages of the present invention, will be best understood by a consideration of the following detailed description of one embodiment of the invention when taken in conjunction with the accompanying drawings wherein:

FIG. 1 is a central cross-sectional view of a ventilating duct, fire wall and damper assembly in accordance with the present invention.

FIG. 2 is a partial and enlarged sectional view of the constructions of FIG. 1 taken along the line 2—2 of FIG. 1 looking in the direction of the arrows.

FIG. 3 is a transverse sectional view taken along the line 3—3 of FIG. 2 showing the mechanism in the open position of the damper blade; and FIG. 4 is a sectional view similar to FIG. 3, however showing the mechanism in the closed position of the damper blade when under the influence of an elevated temperature.

Referring now specifically to the drawings, there is shown in FIG. 1 a duct assembly generally designated by the numeral 10 which includes a first duct portion 12, which is joined to a collar construction 14 by appropriate pins or rivets 16 passing through the respective flanges 12a, 14a. The collar 14 is illustrated as being mounted within a fire wall 18. A second duct section 20 is similarly secured to the collar 14 by fasteners 16 at the flanges 14a, 20a. The duct assembly 10 is merely illustrative of the environment in which a damper assembly in accordance with the invention may be used.

A damper blade, generally designated by the numeral 22 is pivotally mounted within the collar 14 of the duct assembly 10 for movement between an opened position as shown in full line in FIG. 1 and labeled A, and a closed position shown in phantom and designated by the letter B. The damper blade 22 is mounted for pivotal movement by a control and actuating rod 24 which is journalled for rotation within the walls of the collar 14. The position of the rod 24 and therefore the blade 22 is controlled by means of an operating handle 26, shown in phantom in FIG. 1, rigidly secured to the rod 24. An appropriate clearance area 28 in the wall 18, shown in phantom in FIG. 1 is provided for the operating handle 26.

Now referring to FIG. 2 for a more detailed description of the mounting of the damper blade 22 within the collar 14, it will be seen that the collar 14 consists of a top wall 30 and a pair of side walls 32, 34, as well as a bottom wall (not shown). A first bearing 36 is mounted in the side wall 32 and receives the body of the rod 24 mounting same for pivotal movement within the collar 14. As seen in FIG. 2, a first portion 24a of the control and actuating rod 24 extends outwardly of the collar 14 and provides mounting means for the operating handle 26. The operating handle 26 is provided with a securement collar 38 and a set screw 40 which, when tightened upon the protruding portion 24a of the rod 24, forms a rigid interconnection between the handle 26 and the control and actuating rod 24.

Inwardly of the bushing 36 in the side wall 32 of the collar 14, the rod 24 is formed with a reduced diameter portion 42 about which is positioned a rotatable collar 44 approximately equal in outer diameter to the diameter of the first portion 24a of the rod 24. An end section 46, having a diameter still smaller than that of portion 42 is formed at the innermost end of the rod 24. The space between the internal diameter of the sleeve 44 and the outside diameter of the end section 46 is filled with a low melting point material 48 which normally forms a rigid bond between the body of the control and actuating rod 24 and the sleeve 44. Accordingly, the sleeve 44, the low melting point material 48 and the body portions 42, 46, 24a of the control rod 24 normally form a single rigid member.

The damper blade 22 is rigidly mounted on the single rigid member 24 at the sleeve 44 by means of a pair of set screws 50 secured with the mounting collars 52 rigidly formed on the blade 22 and positioned about the sleeve 44. When the screws 50 are tightened against the sleeve 44, the damper blade 22 becomes rigid with the sleeve 44 and, therefore, with the control and actuating rod 24.

Coaxial with the rod 24 and at the opposite side of the damper blade 22 is mounted an auxiliary pivot shaft 54 which is secured to the damper blade 22 by a further mounting collar 56 and an appropriate set screw 58. The end 54a of the auxiliary pivot shaft 54 extends within a bearing 60 mounted in the side wall 34 of the collar 14.

It will be appreciated that normal manipulations of the damper blade 22 are easily effected through the control and actuating rod 24 simply by moving the handle 26 from the position illustrated in FIG. 1 through a clockwise (in FIG. 1) rotation to bring the blade into the closed position. A stop 62 is provided along the inner surface of the collar 14 to accurately locate and maintain the damper blade 22 in its closed position.

Of course, as is well known in the art, a variety of servomechanisms and/or self-powered control elements may be coupled to the rod 24 to provide powered, remote or automatic operation of the damper assembly. At any rate, it will be appreciated that the foregoing description, with the exception of the fact that the control and actuating rod element is formed of more than one element, is essentially the normally employed construction for a ventilating duct damper. Although it is common to provide a large variety of different designs in this general type of damper construction, including multiple-bladed dampers, interlocking closing and opening construction and a large variety of other types of construction, the device as illustrated in FIG. 1 has been shown to be merely exemplary of the types of construction which are presently employed and in which the present invention may be incorporated.

Reference will now be made to FIG. 2 for a detailed description of the relationship between the sleeve 44 and the main body of the control and actuating rod 24 in accordance with the present invention. The reduced diameter portion 42 of the rod 24 has a diameter which is complementary to the inside diameter of the sleeve 44 such that a relatively smooth bearing relationship is formed therebetween. In other words, absent any further element which would prevent rotation of the sleeve 44 on the reduced portion 42 of the shaft 24, the sleeve 44 easily rotates about the reduced diameter portion 42. Accordingly, and now referring to FIG. 1, the pendulum arrangement of the blade 22 would normally tend to cause the blade 22 to fall downwardly from the open position A to the closed position B by the pivotal action of the sleeve 44 (and the blade 22) about the reduced diameter portion 42A of the shaft 24 irrespective of the position of the operating handle 26.

Normally, this closing movement is prevented by the rigid interconnection of the body of the shaft 24 with the sleeve 44 due to the presence of the low melting point material 48 at the innermost end of the rod 24. Specifically, in manufacture a low melting point material, designated by the numeral 48 herein, is placed within the space between the end section 46 and the internal diameter of the sleeve 44. It has been found that the alloy Cerrobend, produced by Cerro de Pasco Corporation, which yields at a temperature of 158 degrees Fahrenheit, provides an excellent low melting point material for the intended purposes of the control and actuating rod 24. Thus, again referring to FIG. 1, when the blade 22 is in its opened position A and the ambient temperature increases to 158 degrees Fahrenheit, the material 48 fuses, thus eliminating the rigid interconnection between the body of the rod 24 and the sleeve 44. The blade 22 then automatically drops under the influence of gravity into its closed position B. In order that the blade 22 may be retained in its closed position B despite air pressure differences on opposite sides of the blade 22, there is built into the control and actuating rod 24 a ratchet assembly 63 best seen in FIGS. 3 and 4. It will be seen that the end portion 46 of the rod 24 is formed with a slot 46a in which is positioned a spring ratchet arm or pawl including a first flat portion 66 which is held within the slot 46a and a second, outwardly curving portion 68 which terminates at a point within the inner diameter of the sleeve 44. The ratchet arm 64 is constructed of a spring steel material such that the ratchet arm 68 may be deflected inwardly from its normal position as shown in FIGS. 3 and 4. A number of inwardly protruding ratchet teeth 70 are formed at the innermost end of the sleeve 44; in the present embodiment four such teeth are formed at 90-degree intervals around the circumference of the sleeve 44.

As will be readily appreciated, when the low melting point material 48 has melted away from the space between the end 46 and the sleeve 44, the sleeve 44 will be released for movement in a clockwise direction about the shaft 24. The ratchet assembly 63 permits this movement since the teeth 70 ride up along the curved ratchet arm 68 and depress the same. On the other hand, the ratchet assembly 63 prevents movement in a counter-clockwise direction due to the engagement of the teeth 70 with the end of the ratchet arm 68.

Accordingly, when the damper blade 28 falls into its closed position B, there is rotation of the sleeve 44 in a clockwise direction about the stationary shaft 24 as may be readily appreciated by comparing FIGS. 3 and 4. Of course, such motion is instituted by the elevation of the ambient temperature to 180 degrees Fahrenheit or more, thereby melting the fusable material 48 and releasing the blade 22 to move under the influence of the biasing force, in this case gravity. With the material 48 no longer forming a bond between the sleeve 44 and the body of the rod 24, the device assumes a position as shown in FIG. 4 wherein the sleeve 44 has rotated an amount sufficient for the ratchet arm 68 to engage the next adjacent tooth 70. Accordingly, the reverse motion of the damper blade 22 through a counter-clockwise rotation is prohibited and the damper asssembly is maintained in its closed position.

It will be appreciated that there is provided in accordance with the present invention a construction wherein a control and actuating element of a damper assembly is provided in a split construction normally joined together by means of a low melting point material. The actuation and control functions may be transmitted to the damper blade through the element under normal operating conditions but when a predetermined ambient temperature is reached, for example, 158 degrees Fahrenheit, the two members of the element become separated, thereby allowing the damper blade to fall under the influence of its built-in bias mechanisms, into its closed position. Accordingly, damper constructions incorporating the design of the present invention provide both the functions of a normal control damper and the functions of a normal fire safety damper.

Although the above description and the accompanying drawings describe only one preferred embodiment of the present invention, a great deal of variety of design may be employed without departing from the basic teachings of the invention. In addition to the fact that large numbers of other types of pivoting arrangements may be constructed which nevertheless employ a pivot control and actuating rod as illustrated herein, more extreme variations from the basic pivot rod constructions may also be constructed without departing from the teachings of the invention. Therefore, the following claim should be construed broadly in a manner consistent with the spirit and scope of the invention.

What I claim is:

1. A damper assembly in combination with a ventilating duct for controlling the air flow in said duct and for automatically closing said duct in the event of a fire comprising a damper blade mounted in said duct for movement between an opened position and a closed position, means biasing said damper blade toward said closed position, a control and actuating element, operating means for selectively moving said damper blade, said control and actuating element operatively interconnected between said damper blade and said operating means for transmitting movement from said operating means to said damper blade, said control and actuating element including at least two separate mutually movable members and a low melting point material normally rigidly interconnecting said members, one of said members being connected to said damper blade and the other of said members being connected to said operating means, said control and actuating element being ineffective to transmit movement from said operating means to said damper blade at an elevated ambient temperature in excess of the melting point of said low melting point material, and ratchet means interconnecting said two members permitting movement therebetween in the direction of closing said damper blade and preventing movement therebetween in the direction of opening said damper blade.

2. A damper assembly for controlling the air flow through the orifice of a ventilating system and for automatically closing said orifice in the event of a fire comprising a damper blade mounted for movement between an opened position and a closed position, means biasing said damper blade toward said closed position, a control and actuating element, and operating means for selectively moving said damper blade, said control and actuating element operatively interconnected between said damper blade and said operating means for transmitting movement from said operating means to said damper blade, said control and actuating element including at least two separate mutually movable members and a low melting point material normally rigidly interconnecting said members, one of said members being connected to said damper blade and the other of said members being connected to said operating means, said control and actuating element being ineffective to transmit movement from said operating means to said damper blade at an elevated ambient temperature in excess of the melting point of said low melting point material, and ratchet means interconnecting said two members, including a pawl on one of said members and ratchet teeth on the other of the said members, permitting movement therebetween in the direction of closing said damper blade and preventing movement therebetween in the direction of opening said damper blade.

3. A damper assembly in combination with a ventilating duct for controlling the air flow in said ventilating duct comprising a damper blade, a control and actuating rod mounting said blade for pivotal movement within said duct between an opened and a closed position, and control means operatively engaged with said rod for rotating same to rotate said damper blade, said rod including a first section, a second section, and a low melting point material rigidly interconnecting said first and second sections, said first section connected to said damper blade and said second section connected to said control means, said two sections being rigidly connected at a temperature below the melting point of said material and being independently rotatable with respect to each other at a temperature above the melting point of said material.

4. A damper in combination with a ventilating duct for controlling the air flow in said ventilating duct comprising a damper blade complementary to the cross-sectional shape of said duct, a control and actuating rod mounting said blade for pivotal movement within said duct between an opened and a closed position, and control means operatively engaged with said rod for rotating same to rotate said damper blade, said rod including a first section, a second section, and a low melting point material rigidly interconnecting said first and second sections, one of said sections connected to said damper blade and the other of said sections connected to said control means, said two sections being rigidly connected at a temperature below the melting point of said material and being independently rotatable with respect to each other at a temperature above the melting point of said material, and ratchet control means between said first and second sections for preventing rotation of said sections with respect to each other in one direction.

5. A damper in combination with a ventilating duct for controlling the air flow in said ventilating duct comprising a damper blade complementary to the cross-sectional shape of said duct, a control and actuating rod mounting said blade for pivotal movement within said duct between an opened and a closed position, and control means operatively engaged with said rod for rotating same to rotate said damper blade, said rod including a first cylindrical section, a second section positioned about and coaxial with a portion of said first section, and a low melting point material rigidly interconnecting said first and second sections, one of said sections connected to said damper blade, the other of said sections connected to said control means, said two sections being rigidly connected at a temperature below the melting point of said material and being independently rotatable with respect to each other at a temperature above the melting point of said material.

6. A damper assembly in combination with a ventilating duct for controlling the air flow in said ventilating duct comprising a damper blade complementary to the cross-sectional shape of said duct, a control and actuating rod mounting said blade for pivotal movement within said duct between an opened and a closed position, and control means operatively engaged with said rod for rotating same to rotate said damper blade, said rod including a first cylindrical section, a second section positioned about and coaxial with a portion of said first section, and a low melting point material rigidly interconnecting said first and second sections, one of said sections connected to said damper blade and the other of said sections connected to said control means, said two sections being rigidly connected at a temperature below the melting point of said material and being independently rotatable with respect to each other at a temperature above the melting point of said material, and ratchet control means between said first and second sections for preventing rotation of said sections with respect to each other in one direction.

References Cited by the Examiner
UNITED STATES PATENTS

| | | | |
|---|---|---|---|
| 869,159 | 10/1907 | Britton | 98—86 |
| 2,242,738 | 5/1941 | Alton | 98—86 |
| 2,270,073 | 1/1942 | Merry | 98—1 |
| 2,287,262 | 6/1942 | Merry | 98—1 |
| 3,165,050 | 1/1965 | Johnson | 98—1 |
| 3,172,347 | 3/1965 | Johnson | 98—1 |

MEYER PERLIN, *Primary Examiner.*